(12) United States Patent
Abe et al.

(10) Patent No.: US 7,360,617 B2
(45) Date of Patent: Apr. 22, 2008

(54) SNOWMOBILE WITH REINFORCED FRAME STRUCTURE FOR IMPROVED ENGINE SUPPORT

(75) Inventors: Tomohisa Abe, Saitama (JP); Kozo Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 301 days.

(21) Appl. No.: 11/068,494

(22) Filed: Feb. 28, 2005

(65) Prior Publication Data
US 2005/0199433 A1 Sep. 15, 2005

(30) Foreign Application Priority Data
Mar. 11, 2004 (JP) ............................. 2004-069126

(51) Int. Cl.
*B62M 29/00* (2006.01)
(52) U.S. Cl. ................... 180/190; 180/182; 180/183
(58) Field of Classification Search ............... 180/190, 180/182, 183.11; 280/797
See application file for complete search history.

(56) References Cited

U.S. PATENT DOCUMENTS

| | | | | |
|---|---|---|---|---|
| 3,743,316 A | * | 7/1973 | Stotesbery | 280/762 |
| 5,054,798 A | * | 10/1991 | Zulawski | 280/16 |
| 5,727,643 A | * | 3/1998 | Kawano et al. | 180/193 |
| 5,996,717 A | * | 12/1999 | Hisadomi | 180/182 |
| 6,095,275 A | * | 8/2000 | Shaw | 180/185 |
| 6,446,744 B2 | | 9/2002 | Wubbolts et al. | |
| 7,104,355 B2 | * | 9/2006 | Hoi | 180/291 |
| 2004/0182624 A1 | * | 9/2004 | Yatagai et al. | 180/190 |

* cited by examiner

*Primary Examiner*—Lesley D. Morris
*Assistant Examiner*—Maurice Williams
(74) *Attorney, Agent, or Firm*—Carrier, Blackman & Associates, P.C.; William D. Blackman; Joseph P. Carrier

(57) ABSTRACT

A snowmobile comprises a left-right pair of skis, an engine and a track belt provided on a vehicle body. The track belt is driven by the engine, and the skis are steered by an operation on a steering handlebar. The vehicle body frame is formed by connecting intermediate frame sections, which are U-shaped in side view, to a front portion of a rear frame section, the rear frame section having a roughly U-shaped section and connecting a front frame section to front portions of the intermediate frame sections. In the vehicle body frame, detachable side frame sections are used to connect the portions between the upper ends of front suspension members for supporting the skis and a front portion of a rear cushion for supporting the track belt. The reinforcing side frame sections include portions which are protuberant to the upper side and curved downwards, respectively. The resulting snowmobile frame structure is rigid enough to accommodate an engine of increased weight.

19 Claims, 7 Drawing Sheets

SNOWMOBILE WITH REINFORCED FRAME STRUCTURE FOR IMPROVED ENGINE SUPPORT

CROSS-REFERENCE TO RELATED APPLICATIONS

The present invention claims priority under 35 USC 119 based on Japanese patent application No. 2004-069126, filed on Mar. 11, 2004. The subject matter of these priority documents is incorporated by reference herein.

BACKGROUND OF THE INVENTION

1. Field of the Invention

The present invention relates to a snowmobile capable of traveling on a snow field, with an engine as a drive source.

2. Description of the Background Art

In snowmobiles designed to travel by the power of an engine, a variety of construction styles and designs for the vehicle body frame have been proposed. For example, in U.S. Pat. No. 6,446,744, Wubbolts et al. disclose the construction of an engine cradle for such vehicles as snowmobiles, ATVs, and related vehicles.

In FIG. 19 of U.S. Pat. No. 6,446,744, the vehicle body frame of the snowmobile is formed by joining to each other a sub frame, left and right engine walls, and a tunnel frame composed of a top plate and side plates, in this order from the front side toward the rear side. It is shown in this reference that the engine is mounted on central portions of the left and right engine walls of the vehicle body frame from the upper side.

In recent years, there have been an increasing number of cases where a comparatively heavy 4-cycle engine is adopted for use in a snowmobile, in place of a comparatively lightweight 2-cycle engine. When the heavy 4-cycle engine is used in these vehicles, it is preferable to enhance the rigidity of the vehicle body frame.

SUMMARY OF THE INVENTION

It is an object of the present invention to provide a snowmobile having a frame structure that is rigid enough to accommodate an engine having an increased weight.

In a first aspect of the invention, a snowmobile comprises a left-right pair of skis, an engine, and a track belt provided on a vehicle body in this order from the front side toward the rear side. The track belt is driven by the engine, and the skis are steered by an operation of a steering handlebar. The portions of the frame which receive the forces resulting from contact with the ground are the front suspension members via the skis at the front end of the vehicle, and the rear shock absorber via the track belt at the rear end of the vehicle. The invention is characterized in that the frame portion extending between the upper ends of front suspension members for supporting the skis, and the frame portion supporting a front end of a rear shock absorber for supporting the track belt are both reinforced by side frame sections being protuberant to the upper side and curved downwards.

Accordingly, the side frame sections are added to the vehicle body frame forming the skeleton of the vehicle body, and the portions between the upper ends of the front suspension members and a front portion of the rear cushion for supporting the track belt are reinforced by side frame sections. This configuration ensures that the rigidity of the vehicle body frame is easily and effectively enhanced by connecting the key portions of the frame to each other easily and in a compact fashion. The specific key portions of the frame are those which receive the forces resulting from contact with the ground. As a result, an increase in the weight of the engine is accommodated, without using any reinforcement members to reinforce the vehicle body frame other than the side frame sections.

In a second aspect of the invention, a steering shaft for transmitting a steering force is rotatably supported by a cross pipe that connects the side frame sections disposed on the left and right sides. The steering shaft is rotatably supported by the cross pipe provided for connection between the side frame sections so as to restrain the left and right side frame sections from moving in a direction transverse to the longitudinal direction of the vehicle. Since the steering shaft is supported by the cross pipe, the cross pipe is used for the dual functions of reinforcement and steering shaft support.

In a third aspect of the invention, the side frame sections are detachably attached to the vehicle body frame. Accordingly, the side frame sections can be detachably attached to the vehicle body frame constituting the vehicle body, reducing the number of assembly steps.

In a fourth aspect of the invention, the side frame sections are each formed of an angular pipe. The interior surfaces of the angular pipe are provided with a reinforcement rib. Since the reinforcement ribs are provided in the inside of the side frame sections, in addition to the rectangular section of the side frame sections, it is possible to remarkably enhance the flexural rigidity and deflectional rigidity of the side frame sections. In addition, there is the benefit that the side frame sections are angular pipes which are inexpensively available through drawing or the like.

In a fifth aspect of the invention, an air cleaner is supported on the side frame sections. The air cleaner is supported by use of parts of the side frame sections which are externally added for the purpose of enhancing the rigidity of the vehicle body frame, so that the air cleaner can be easily mounted in position.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION OF THE INVENTION

Figure 1:
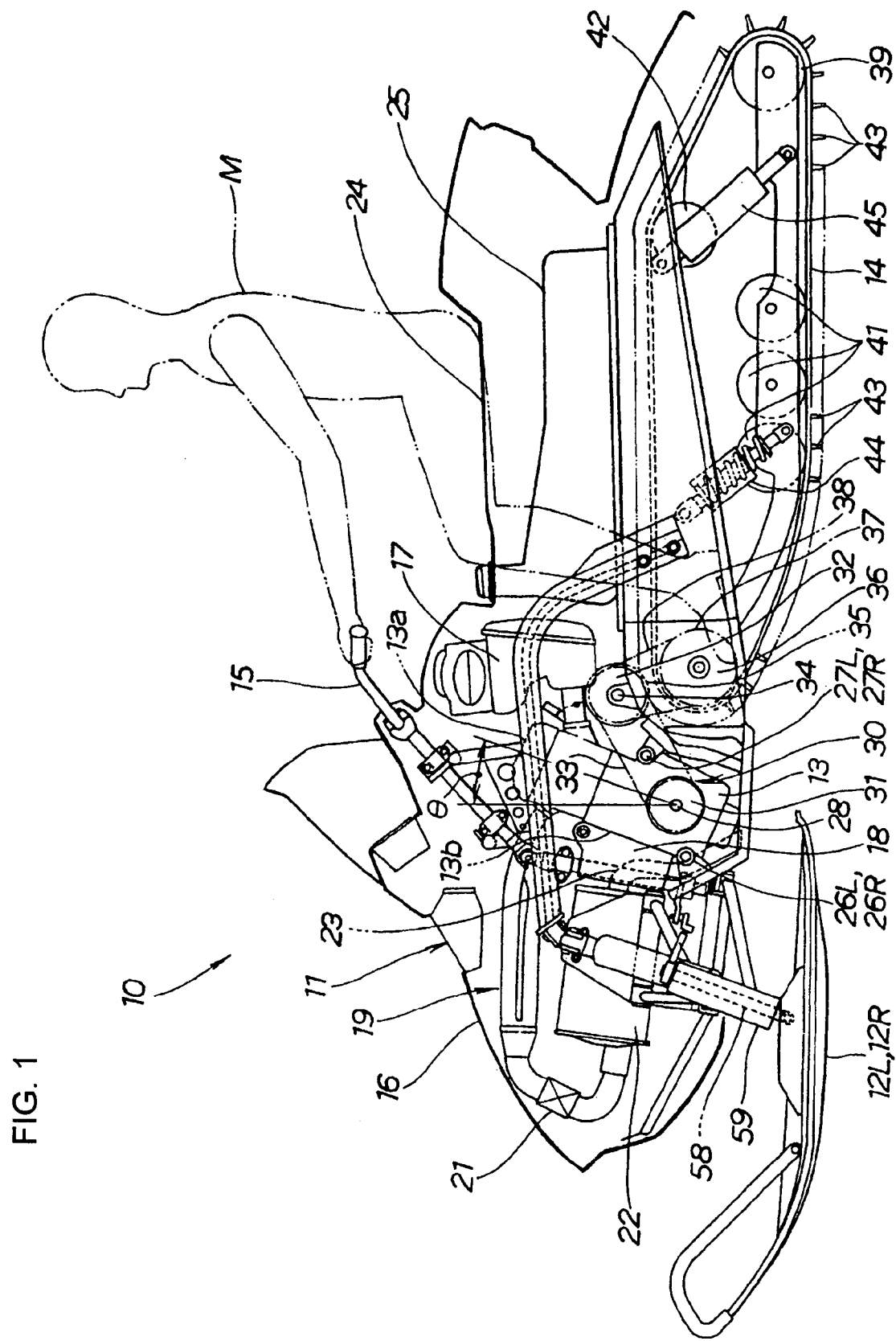
FIG. 1 is an overall side plan view of a snowmobile having an improved engine frame structure according to an embodiment of the present invention, with selected body panels omitted from the drawing to show internal structure of the snowmobile.

The best mode for carrying out the present invention will be described below, based on the accompanying drawings. In the drawings and the accompanying description, L is a subscript indicating the left side of the snowmobile as viewed from the driver's perspective, and R is a subscript indicating the right side of the snowmobile as viewed from the driver's perspective.

FIG. 1 is an overall side plan view of a snowmobile having an improved engine frame structure according to an embodiment of the present invention, with selected body panels omitted from the drawing to show the internal structure of the snowmobile. The snowmobile 10 is a snow vehicle which includes a left-right pair of skis 12L, 12R, an engine 13 and a track belt 14 arranged in this order, as seen from the front side toward the rear side of a vehicle body 11. The snowmobile travels by driving the track belt 14 by the power of the engine 13, and the skis 12L, 12R are steered by operating a steering handlebar 15.

The engine 13 is provided at a front portion of the vehicle body, and a seat 24 for the operator is provided in back of the engine 13. A fuel tank 25 is provided below the seat 24, and is formed to be elongated along the front-rear direction of the snowmobile 10.

Figure 3:
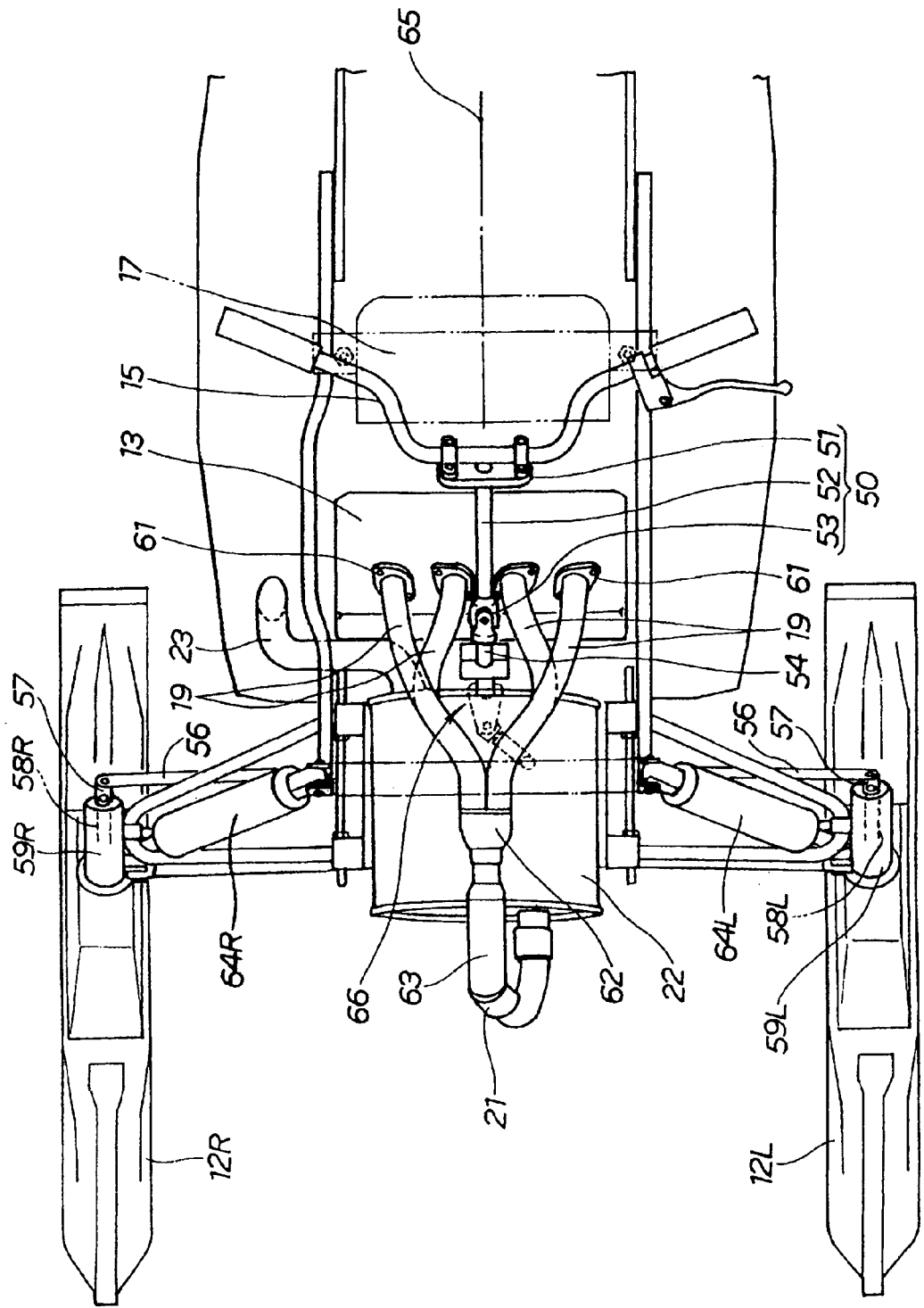
FIG. 3 is a top plan view of the front portion of the snowmobile of FIG. 1 with the vehicle body cover omitted, showing alignment of the muffler and other exhaust system components with the longitudinal center line of the vehicle.

In FIG. 1, a operator M is shown seated on the seat 24. Also shown in FIG. 1, the engine 13 includes a head portion 13a and a cylinder 13b. Also shown are a vehicle body cover 16, an air cleaner 17, an oil tank 18, an exhaust pipe 19, a catalytic converter 21, a muffler 22, and a tail pipe 23 (FIG. 3). The configuration of the steering system will be described below in detail with respect to another drawing.

First, an intake and exhaust system will be described. Air is first taken in through the air cleaner 17, and is then fed into a combustion chamber of the engine 13. Since the air cleaner 17 is disposed between the fuel tank 25 and the engine 13, inspection of the air cleaner 17 and replacement of an air filter element can be easily carried out. A throttle valve 46 (FIG. 2) is provided on the downstream side of the air cleaner 17, and 47 denotes a fuel injector provided on the downstream side relative to the throttle valve 46.

Figure 2:
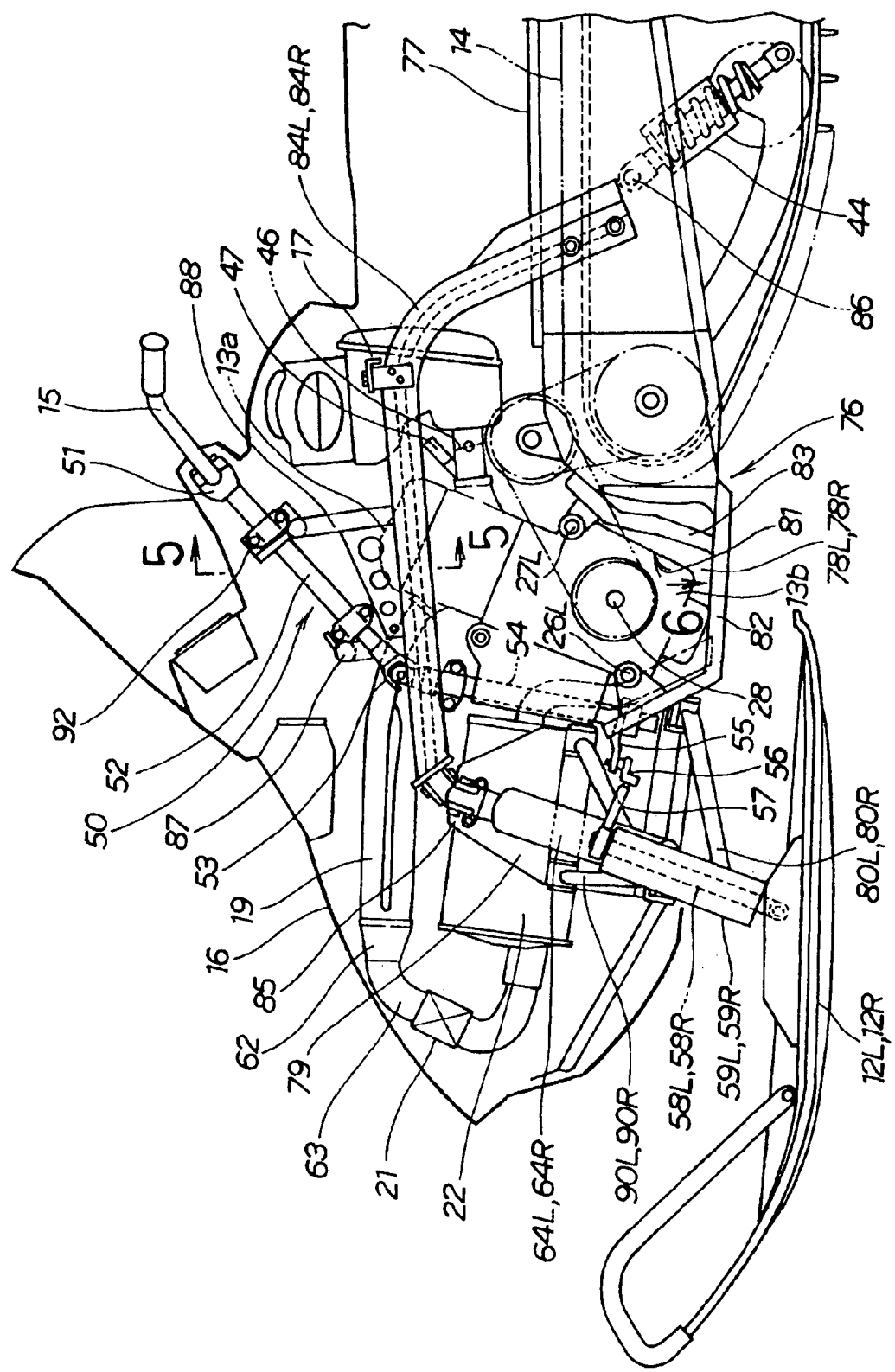
FIG. 2 is a partial side plan view of a front portion of the snowmobile of FIG. 1, showing the frame structure surrounding the engine.

An exhaust gas, generated upon combustion, is discharged into the atmosphere through the exhaust pipe 19, the catalyst 21, the muffler 22, and the tail pipe 23 (FIGS. 2, 3). The tail pipe 23 extends from the muffler 22, then bends to extend transverse to the front-rear direction of the vehicle, and then bends again to extend downward, whereby the exhaust gas is blown to the snow surface.

Next, a drive system will be described. The engine 13 is mounted on a vehicle body frame 76 through motor mounts 26L, 26R, 27L, 27R (FIG. 6) (details of the layout of the motor mounts will be described later).

A drive pulley 31 is fitted over a crankshaft 28 of the engine 13. A continuously variable transmission (CVT) belt 33 is wrapped around both the drive pulley 31 and a driven pulley 32 disposed under the air cleaner 17. This configuration constitutes a belt-type non-stage transmission 30. A cross shaft 34 supports the driven pulley 32 and extends in the transverse direction of the snowmobile. A sprocket 35 is attached to the tip end of the cross shaft 34, and a chain 38 is wrapped around both the sprocket 35 and a sprocket 37 annexed to a drive wheel 36.

The power of the engine 13 is transmitted sequentially through the drive pulley 31, the CVT belt 33, the driven pulley 32, the cross shaft 34, the sprocket 35, the chain 38, and the sprocket 37, whereby the drive wheel 36 can be rotated to propel the snowmobile 10 in the forward or reverse direction.

The endless track belt 14 wraps around the drive wheel 36, which is disposed at a front portion of the track belt 14. The track belt 14 also wraps around the driven wheel 39, disposed at a rear portion of the track belt 14, a plurality of rotary wheels 41 disposed at an intermediate lower portion of the track belt 14, and an idler 42 disposed at an upper portion of the track belt 14. Projections 43 are provided extending outwardly on the outside surface of the track belt 14, and the projections are driven into the snow surface, to provide traction for traveling. Vertical movements of the track belt 14, generated at the time of riding over the ruggedness on the snow surface and the like, are absorbed by rear shock absorbers 44, 45.

FIG. 2 is a side view of a front portion of the snowmobile according to the present invention, in which the steering handlebar 15 and the skis 12L, 12R are connected by use of a steering shaft 50 (described below) and linking members. The steering shaft 50 includes a steering shaft upper portion 52, which is inclined with the tower end extending forwardly. A steering handlebar clamp 51 is provided at the top end of the steering shaft upper portion 52. A universal joint 53 is attached to the lower end of the steering shaft upper portion 52, and a steering shaft lower portion 54 extends substantially vertically downwardly from the universal joint 53.

A lever 55 is provided at the lower end of the steering shaft lower portion 54. A drive link member 56 extends in the vehicle width direction and is connected to the lever 55. The ski control levers 57 are attached respectively to the left and right ends of the drive link member 56. Vertically directed spindles 58L, 58R are rotated about roughly vertical axes by the ski control levers 57, whereby the skis 12L, 12R can be steered. The spindles 58L, 58R are rotatably contained in front leg portions 59L, 59R. The front leg portions 59L, 59R are vertically movably supported by lower arms 80L, 80R, upper arms 90L, 90R and front suspension members 64L, 64R, which are vertically movably mounted to the vehicle body frame.

In addition, a characteristic feature of the invention lies in that the muffler 22 is disposed on the front side (the left side as seen in the figure) of the engine 13, and the steering shaft lower portion 54 of the steering shaft 50 passes between the muffler 22 and the engine 13. The engine 13 is disposed in back of the steering shaft lower portion 54. Namely, the steering shaft lower portion 54 is disposed in front of the engine 13, so that the engine 13 can easily be moved rearwardly.

There are two possible configurations relating the steering shaft 50 and the muffler 22. In one configuration, the steering shaft lower portion 54 passes on the front side of the muffler 22. In the other configuration, the steering shaft lower portion 54 passes between the muffler 22 and the engine 13.

If, as in the first configuration, the steering shaft lower portion 54 passes on the front side of the muffler 22, the overall length of the steering shaft 50 becomes large. From this point of view, the second configuration is preferred in the present invention. Specifically, the steering shaft lower portion 54 passes between the muffler 22 and the engine 13, so that a shortened steering shaft 50 is easily achieved.

In addition, a characteristic feature of the invention resides in that the universal joint 53 is interposed at an intermediate portion of the steering shaft 50, and the steering shaft lower portion 54 is set close to the engine 13. When the steering shaft lower portion 54 is set close to the engine 13, the muffler 22 can also be set close to the engine 13. As a result, it is possible to achieve concentration of mass in the vehicle body front-rear direction.

The vehicle body frame 76 includes a rear frame 77 and a pair of intermediate frame sections 78L, 78R, formed in U shape in side view, are connected to front portions of a rear frame section 77. The rear frame section 77 is roughly U shaped in section, opened to the lower side so as to straddle the top surface and the left and right side surfaces of the track belt 14. A front frame section 79 is connected to front portions of the intermediate frame sections 78L, 78R. The vehicle body frame is characterized in that a reinforcement (as described below) is applied to the intermediate frame sections 78L, 78R.

The intermediate frame sections 78L, 78R are made to be U-shaped in side view as previously noted, and each is provided with a cutout portion 81 formed therein, for permitting the crankshaft 28 or the like to pass therethrough. Since the intermediate frame sections 78L, 78R are U-shaped frame sections, it is desirable to apply appropriate reinforcement to the frame sections. In view of this, an L-shaped reinforcement member 82 and an I-shaped reinforcement member 83 are annexed to each of the intermediate frame sections 78L, 78R along the cutout portion 81, to thereby reinforce the cutout portion 81.

Further, an upper portion of the front frame section 79 and a front upper portion of the rear frame section 77 are connected by side frame sections 84L, 84R so as to cross above the cutout portion 81. As seen in FIG. 2, the side frame sections 84L, 84R extend rearwardly, and are non-linear in shape, so as to curve downwardly at a rear portion thereof.

Specifically, the front suspension members 64L, 64R are mounted to the front frame section 79, and the tip ends of the side frame sections 84L, 84R are connected to front frame section in the vicinity of a suspension receiving portion 85 thereof, provided for mounting the front suspension members 64L, 64R to the vehicle body frame.

The rear shock absorber 44 is mounted to the rear frame section 77, and the rear ends of the side frame sections 84L, 84R are connected to the rear frame section 77 at a shock absorber receiving portion 86 thereof, provided for mounting the shock absorber 44 to the rear frame section 77. By this configuration, the front frame section 79 and the rear frame section 77 are firmly connected to each other.

Returning to FIG. 1, in the depicted embodiment, the engine 13 is transversely mounted on the body frame 76, and is disposed so as to be inclined, as shown, with the upper end thereof tilted toward the rear of the vehicle. Specifically, the engine head portion 13a and the cylinder 13b are inclined rearwardly, relative to the vertical axis, by an angle θ. Thus, the center of gravity of the engine is lowered, and the center of gravity of the snowmobile is set to be close to the center of the vehicle body. Since the center of gravity is set to be close to the center of the vehicle body, it is possible to keep the vehicle body stable, particularly during high-speed operation and during operation on a rugged and uneven snow surface. As a result, a more pleasant operating experience is achieved.

FIG. 3 is a top plan view of a front portion of the snowmobile according to the illustrative embodiment of the present invention, with the vehicle body cover omitted for purposes of illustration. The engine 13, shown in this embodiment as a 4-cylinder engine, is disposed transversely to the longitudinal axis 65 on the vehicle body frame 79 so that the crankshaft extends in the vehicle width direction, and the plural exhaust ports 61 are directed toward the front.

The plural exhaust pipes 19 extend respectively from the exhaust ports 61, and are merged together and united into a single pipe at an exhaust pipe manifold portion 62. A single exhaust pipe 63 extends forward from an outlet of the exhaust pipe manifold portion 62, is then bent back in a U shape, and is connected to a front (inlet) portion of the muffler 22. The left and right front suspension members 64L, 64R are disposed, respectively, on the left and right sides of the muffler 22.

As is clear from the figure, the muffler 22 is disposed so that the longitudinal axis thereof is parallel to the longitudinal axis 65 of the vehicle body (an axis aligned with the vehicle centerline, and extending from front to rear of the vehicle). Thus, the length of the muffler 22 does effect the overall vehicle body width. The muffler 22 is disposed between the left and right front suspension members 64L, 64R, which allows adoption of a slim vehicle body, and a reduction in the vehicle body size.

In addition, since the muffler 22 is disposed in front of the engine 13, the muffler 22 can be laid out along the longitudinal axis 65, or in the vicinity of the longitudinal axis 65. As a result, the vehicle is more easily balanced in the left-right direction, and steering performance is enhanced.

Furthermore, the steering shaft 50 passes between adjacent exhaust pipes 19, 19. As a result, a dead space 66, which is customarily generated between the adjacent exhaust pipes 19, 19, is now used as an effective working space.

Returning to FIG. 2, in the depicted embodiment hereof, the exhaust pipes 19 and the exhaust pipe manifold portion 62 pass above the muffler 22. As a result, the muffler 22 is disposed below the exhaust pipes 19. Mufflers 22 used in recent years are comparatively large in size and are heavy. Since a large, heavy muffler 22 is laid out at a low position, the center of gravity of the vehicle body is further lowered.

The vehicle body frame 76 is a frame in which the intermediate frame sections 78L, 78R, which are U-shaped in side view, are connected to front portions of the rear frame section 77. As stated above, the rear frame section 77 has a roughly U shaped section, inverted and opened to the lower side, so as to straddle the upper surface and the left and right side surfaces of the track belt 14. The front frame section 79 is connected to front portions of the intermediate frame sections 78L, 78R, such that the following reinforcement is applied to the intermediate frame sections 78L, 78R.

The intermediate frame sections 78L, 78R are U-shaped in side view, and are each provided with the cutout portion 81 formed therein for permitting the crankshaft 28 or the like to pass therethrough. Since the intermediate frame sections 78L, 78R are U-shaped frame sections, it is desirable to reinforce them. In view of this, the L-shaped reinforcement member 82 and the I-shaped reinforcement member 83 are secured to the intermediate frame sections 78L, 78R along the cutout portion 81, to thereby reinforce the cutout portion 81.

Further, an upper portion of the front frame section 79 and a front upper portion of the rear frame section 77 are connected by side frame sections 84L, 84R, which extend so as to cross above the cutout portion 81.

Specifically, the front suspension members 64L, 64R are mounted to the front frame section 79, and the tip ends of the side frame sections 84L, 84R are connected to the front frame section in the vicinity of the suspension receiving portion 85, provided for mounting the front suspension members 64L, 64R to the front frame section 79.

The upper end of the rear shock absorber 44 is mounted to the rear frame section 77, and the rear ends of the side frame sections 84L, 84R are also connected to the rear frame section 77, in the vicinity of the shock absorber receiving portion 86.

The portions between the upper ends of the front suspension members 64L, 64R, which support the skis, and a front portion of the rear shock absorber 44, which supports the track belt 14, are each respectively reinforced with the side frame sections 84L, 84R curved downwards. The side frame sections 84L, 84R can be detachably attached to the vehicle body frame 76. Firm connection between the front frame section 79 and the rear frame section 77 can be attained by the side frame sections 84L, 84R. The side frame sections 84L, 84R can be easily mounted to the vehicle body frame, so that it is possible to achieve a reduction in the number of steps for assembling the side frame sections 84L, 84R.

In addition, the air cleaner 17 is supported on the side frame sections 84L, 84R. Specifically, the air cleaner 17 is mounted to the side frames from the outside, for the purposes of enhancing the rigidity of the vehicle body frame 76, and so that the air cleaner 17 can be easily mounted.

Figure 4:
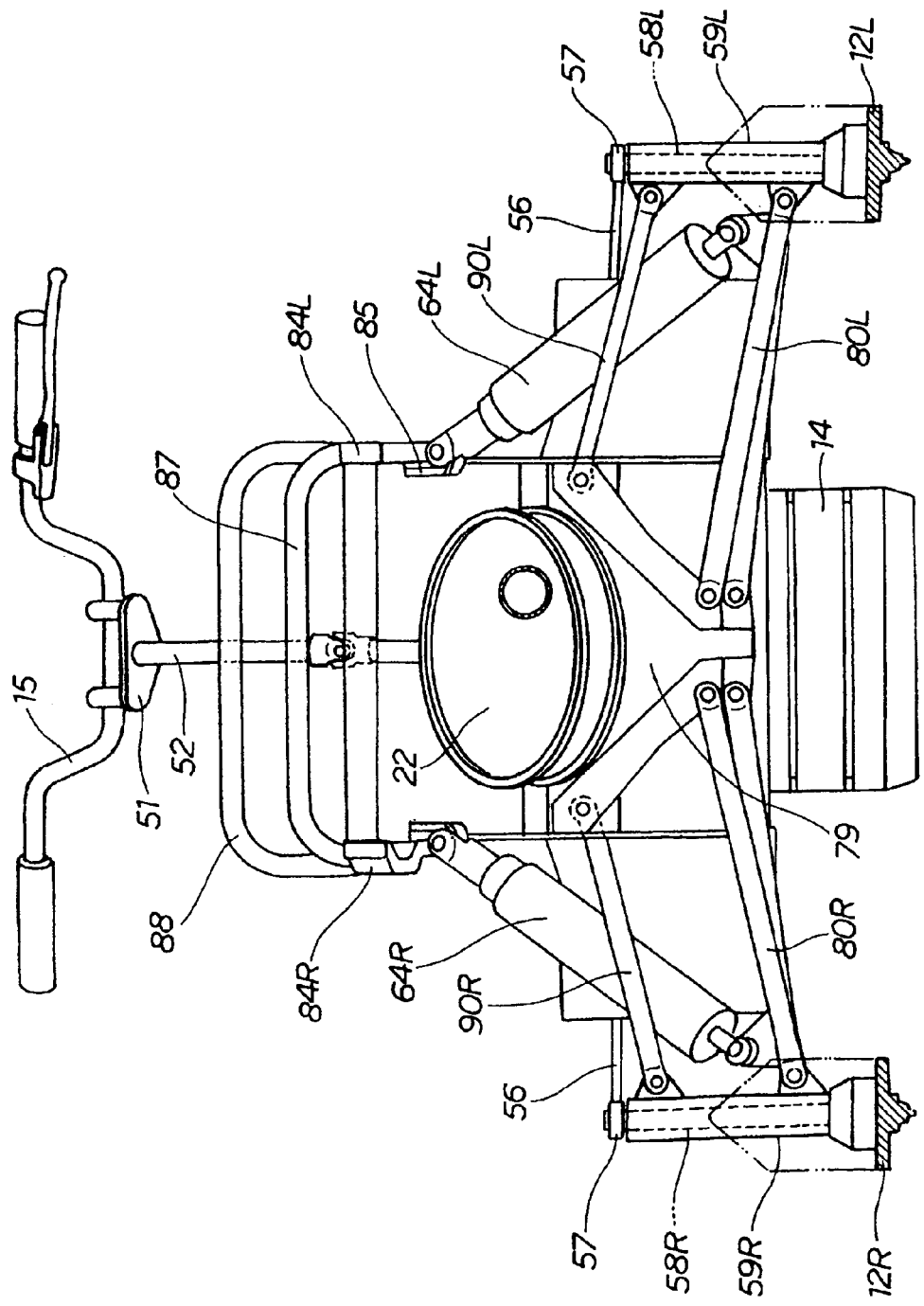
FIG. 4 is a front plan view of the snowmobile of FIG. 1 with the vehicle body cover omitted, showing the connection of the enhanced frame structure to the snowmobile suspension.

FIG. 4 is a front plan view of the snowmobile 10 according to illustrative embodiment of the present invention, in which the vehicle body cover is omitted. A suspension mechanism for the skis 12L, 12R is provided as follows: As seen in this figure, the lower arms 80L, 80R extend from the front frame section 79 to the left and right sides. A pair of upper arms 90L, 90R extend to the left and right sides from the front frame section 79, and the front leg portions 59L, 59R are connected to the tip ends of the arms 80L, 80R, 90L, 90R. In addition, the lower ends of the front suspension members 64L, 64R are connected to the outer tip ends of the lower arms 80L, 80R.

The left and right side frame sections 84L, 84R are present behind these portions as viewed in the figure to support the left and right front suspension members 64L, 64R. The two front and rear cross pipes 87, 88 are bridgingly disposed between the side frame sections 84L, 84R, to form a reinforced structure that enhances the rigidity in the vehicle body transverse direction.

Figure 5:
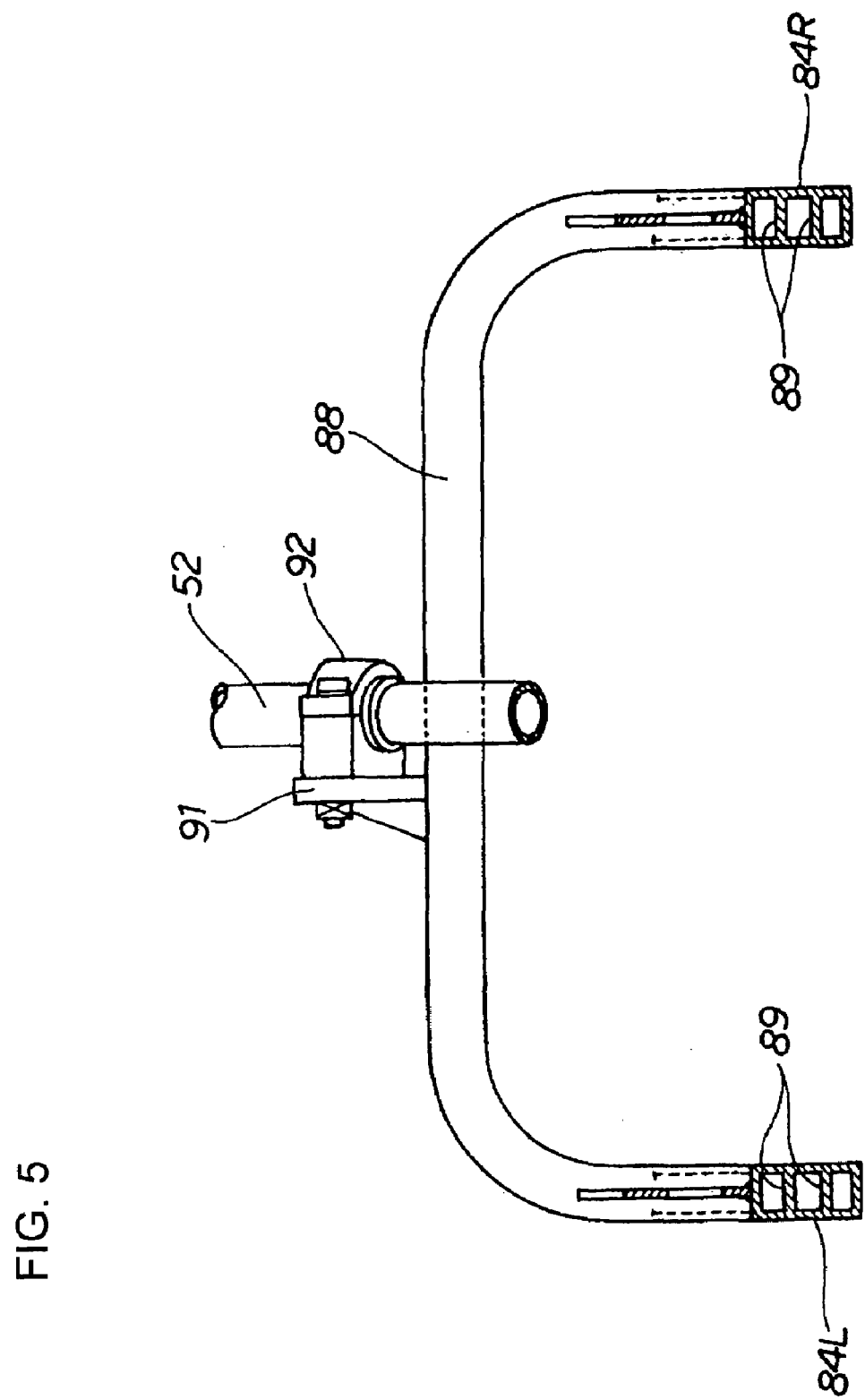
FIG. 5 is a sectional detail view of part of the front frame section structure, taken along line 5-5 of FIG. 2 and showing the crossbar which joins the opposed side frame sections, and the steering bar mounted to the cross bar.

FIG. 5 is a sectional view along line 5-5 of FIG. 2, in which the left and right side frame sections 84L, 84R, coupled by the cross pipe 88, are composed of extruded members being rectangular in section. Two internal reinforcing ribs 89, 89 are bridgingly provided inside of each molded side frame member, in addition to the rectangular section, whereby it is possible to drastically enhance the flexural rigidity and deflectional rigidity. Since extrusion permits free selection of the sectional shape, any desired sectional shape or configuration can be obtained, which may be modified by decreasing or increasing the number of the reinforcing ribs 89.

In addition, the cross pipe 88 is provided with a support bracket 91, a bearing block 92 is attached to the bracket 91, and the steering shaft upper portion 52 is rotatably supported on the bearing block 92. With the steering shaft upper portion 52 movably supported by the cross pipe 88, provided primarily to reduce or prevent transverse motion of the left and right side frame sections 84L, 84R, the cross pipe 88 has multiple functions.

Figure 6:
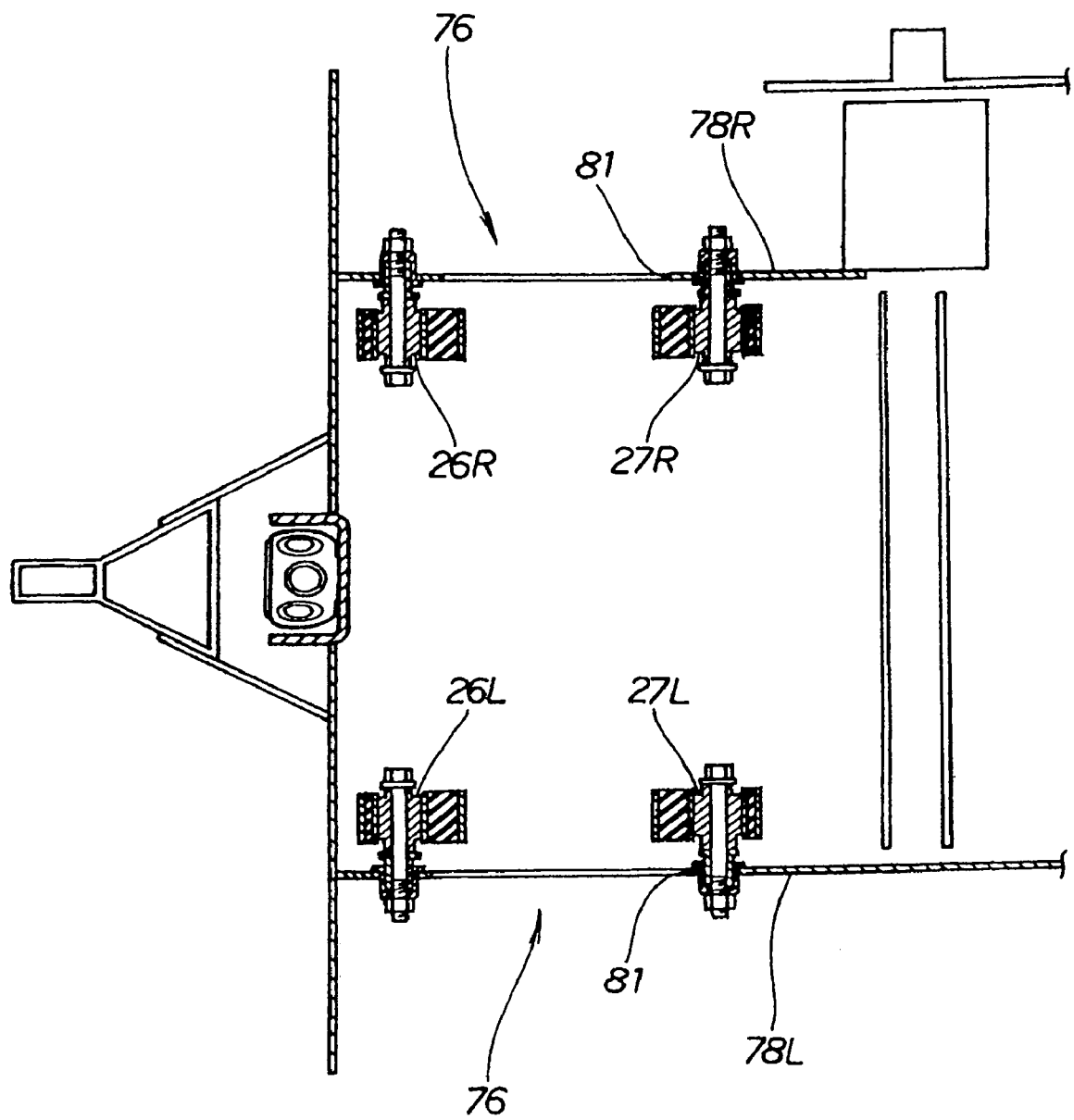
FIG. 6 is a sectional detail view of part of the front frame section structure, taken along arrow 6 of FIG. 2, and showing the engine mounting hangers arranged on the front and rear, left and right sides of the frame.

FIG. 6 is a view along arrow 6 of FIG. 2, showing that the left intermediate frame 78L is provided with two left motor mounts 26L, 27L, whereas the right intermediate frame 78R is provided with two right motor mounts 26R, 27R. The engine is supported on the vehicle body frame 76 through the four motor mounts 26L, 26R, 27L, 27R arranged on the front and rear sides and the left and right sides.

Figure 7:
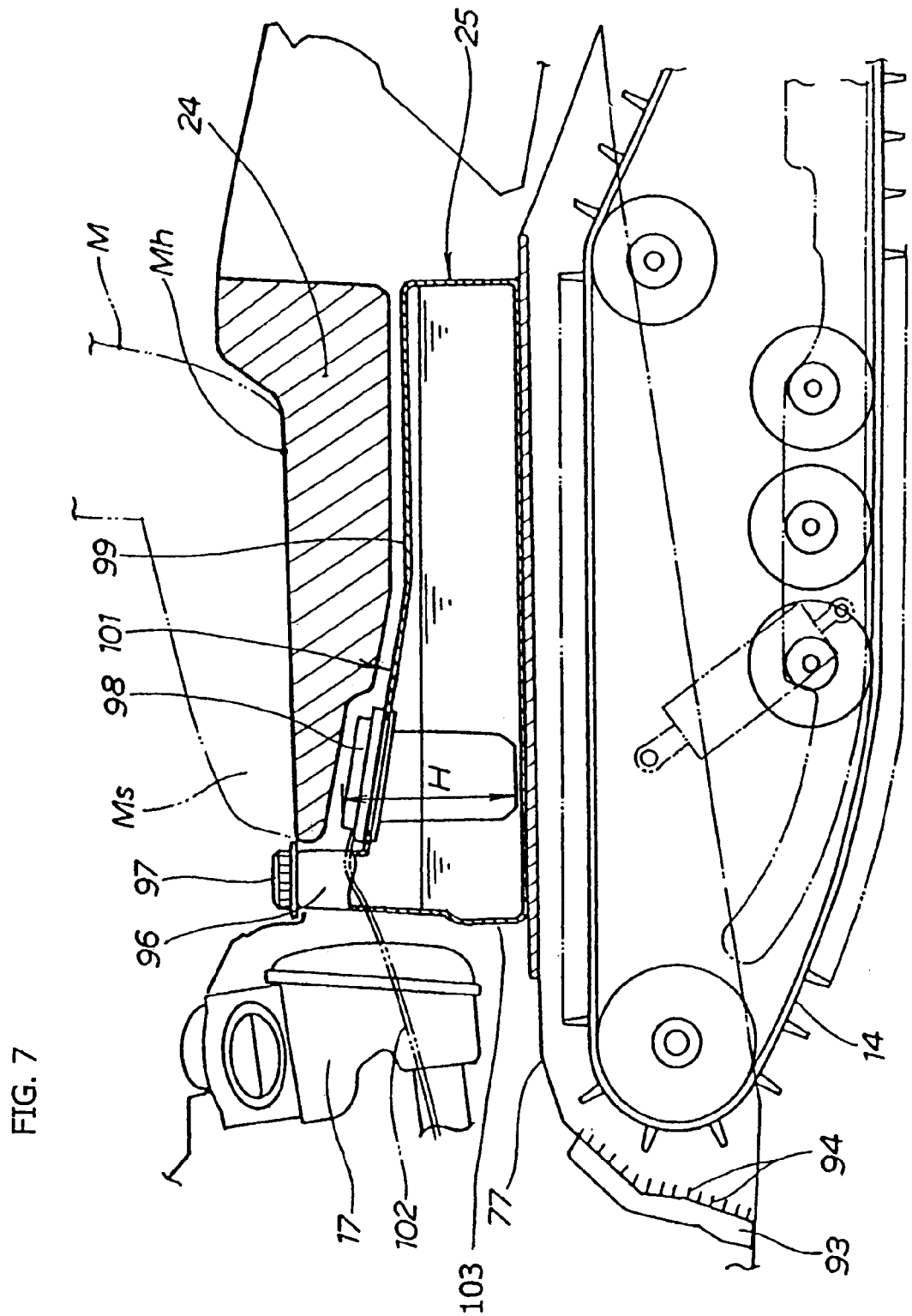
FIG. 7 is a sectional view of a fuel tank according to the selected embodiment of the present invention, showing the fuel tank top surface at the front side thereof raised upward relative to the top surface at a rear portion of the fuel tank, and showing the fuel pump provided in the raised top surface portion for feeding pressurized fuel to the engine.

FIG. 7 is a sectional view of the fuel tank according to the selected embodiment of the present invention. As stated previously, the snowmobile 10 comprises the seat 24, for supporting the operator, in back of the air cleaner 17. In the figure, Mh represents the location of the normal seating position of the operator on seat 24.

The fuel tank 25 is provided below the seat 24, and is elongated in the front-rear direction. The height of the top surface of the fuel tank 25 at the seating position Mh is lower than the height of the top surface of the fuel tank 25 at other portions of the fuel tank. Specifically, the height of the top surface of said fuel tank at a location underlying a rear portion of the seat 24 is lower than the height of said top surface at other portions of said fuel tank. In other words, the top surface of the fuel tank 25 adjacent to the front side 103 of the fuel tank 25 is positioned to be higher than remaining portions. A raised portion 101, shown here as an incline but not limited to this shape, is provided by joining the relatively high front side 103 of the fuel tank 25 to the top surface of the fuel tank at a location below the seating position Mh.

The fuel pump 98, for pressurizing and feeding the fuel in the fuel tank 25 to the engine, is provided in the raised portion 101. The fuel pump 98 is attached to the top surface of the fuel tank 25, and the fuel supply pipe 96 for supplying fuel to the fuel tank 25 is provided adjacent to the front side 103 of the fuel pump 98.

Since the fuel pump 98 is attached to the top surface of the fuel tank 25, mounting and piping work for a fuel pipe 102 can be easily carried out from the upper side of the fuel tank 25. In addition, maintenance, such as inspection and replacement of the fuel pipe 102, is easily accomplished.

Further, since the fuel supply pipe 96 for supplying fuel to the fuel tank 25 is provided on the front side of the fuel pump 98, the length of the seat 24 is large.

A radiator 93 is formed as one body with the rear frame section 77. The radiator 93 is provided with plural heat-radiating fins 94 so that the snow raked up by the track belt 14 comes into contact with the heat-radiating fins 94. The radiator 93 extends over the entire lower surface of the rear frame section 77, providing a large, efficient heat-transfer area.

In addition, it is shown herein that the generally box-shaped fuel tank 25 is disposed on the rear frame section 77, and the seat 24 is disposed on the upper side of the fuel tank 25. The seat 24 is formed to be thicker in the region of the seating position Mh of the operator M, and to be thinner at its portion which is clamped by both knees Ms of the operator M. Use of a relatively thin seat adjacent to the knees Ms of the operator M is acceptable since no substantial load is exerted at this location.

On the other hand, since the fuel tank 25 is fitted with the fuel supply pipe 96, a fuel supply cap 97 and the fuel pump 98, it is desirable to provide the fuel supply pipe 96 at a position as high as possible. Additionally, the fuel pump 98 is inserted into the fuel tank 25 from the upper side. As a result, the fuel pump 98 can be inspected immediately upon opening the seat 24.

The engine according to the present invention is a fuel injection type engine, and, for this purpose, it is essential for the fuel pump 98 to be a high-pressure pump and be a large-sized pump. In order to contain the large-sized pump, it is necessary for the fuel tank 25 to have a predetermined height (vertical depth).

In view of this, with respect to a ceiling plate 99 of the fuel tank 25, the portion of the ceiling plate ranging from an intermediate position to a front side 103 is made to be a raised portion 101. The raised portion 101 is inclined forwardly upwards, to provide the required, predetermined height. As a result, the fuel supply pipe 96 can be mounted at a higher position. Similarly, the fuel pump 98 is attached to a higher portion so that the height of the fuel pump 98 is accommodated.

Since the fuel tank 25 is provided with the raised portion 101 on the front side and since the fuel pump 98 is provided in the raised portion 101, the fuel pump 98 can be laid out under the seat 24 even if the dimension H in the vertical direction of the fuel pump 98 is large. In addition, the thickness of the seat 24 at the seating position Mh, where the operator M is normally seated, is made sufficiently large to enhance seating comfort.

Corresponding to this, the height of the fuel tank 25 at a rear half portion is set to be small so as to allow for the thickness of the seat 24, whereby the seating comfort is enhanced. As is clear from the figure, in the present invention, the height of the seat 24 and the height of the fuel tank 25 are harmonized, whereby it is possible to secure both the required thickness of the seat 24 and the required height of the fuel tank 25, while keeping constant the overall height from the top surface of the seat 24 to the bottom surface of the fuel tank 25.

Returning to FIG. 2, the side frame sections 84L, 84R are added to the vehicle body frame 76, which constitutes the skeleton of the vehicle body. The portions of the vehicle body frame 76 between the upper ends of the front suspension members 64L, 64R and a front portion of the rear shock absorber 44, for supporting the track belt 14, are reinforced with the side frame sections 84L, 84R. Since the rigidity of the vehicle body frame 76 is easily and effectively enhanced by only adding the side frame sections 84L, 84R, an increased engine weight is managed using only the addition of the side frame sections 84L, 84R, and without using any other reinforcement member.

By reinforcing the portions between the front suspension members 64L, 64R with the side frame sections 84L, 84R, it is possible to effectively enhance the rigidity of the vehicle body frame 76. By adding the side frame sections 84L, 84R, it is possible to enhance the rigidity of the vehicle body and, therefore, to easily cope with an increase in the engine weight.

While the snowmobile comprising a fuel pump in the inside of a fuel tank according to the present invention has been described with respect to a snowmobile to illustrate the mode for carrying out the invention, the inventive concept can be applied to a motorcycle, and it may also be applied to vehicles generally.

The snowmobile comprising the side frame sections according to the present invention is preferable for application to snowmobiles.

While a working example of the present invention has been described above, the present invention is not limited to the working example described above, but various design alterations may be carried out without departing from the present invention as set forth in the claims.

What is claimed is:

1. A snowmobile comprising
a vehicle body,
a steering handlebar,
a left-right pair of skis, said skis being steered by an operation of the steering handlebar,
an engine,
a track belt provided on the vehicle body, said track belt being driven by said engine,
front suspension members for supporting said skis,
rear shock absorbers for supporting said track belt,
wherein
portions between upper ends of said front suspension members and a front portion of the rear shock absorbers are reinforced by side frame sections, the side frame sections being protuberant to the upper side and curved downwards,
wherein each of the side frame sections comprises a hollow pipe having a plurality of internal reinforcement ribs formed on an inner surface thereof; and
wherein said hollow pipe has a closed cross section.

2. A snowmobile as set forth in claim 1, wherein
the snowmobile comprises a steering shaft for transmitting a steering force produced by the steering handlebar to the skis,
the steering shaft is rotatably supported by a cross pipe which forms a connection between said side frame sections, and
the side frame sections are respectively disposed on the left and right sides of the vehicle body.

3. A snowmobile as set forth in claim 1, wherein an air cleaner is supported on said side frame sections.

4. A snowmobile as set forth in claim 1, wherein each of said side frame sections is formed of an angular pipe, the angular pipe comprising said plurality of reinforcement ribs formed on an interior surface thereof.

5. A snowmobile as set forth in claim 1, wherein said hollow pipe of each of said side frame sections is formed of an angular pipe having a closed rectangular cross section, the angular pipe comprising said plurality of reinforcement ribs.

6. A snowmobile as set forth in claim 1, wherein said hollow pipe of each of said side frame sections is formed of an angular pipe having a closed rectangular cross section, the angular pipe comprising at least two reinforcement ribs formed on an interior surface thereof.

7. A snowmobile as set forth in claim 1, wherein said hollow pipe of each of said side frame sections is formed of an angular pipe, the angular pipe comprising intersectingly reinforcing ribs formed on an inner surface thereof.

8. A snowmobile as set forth in claim 1, wherein the snowmobile further comprises a muffler, wherein said muffler is mounted on the forward side of the engine relative to the forward traveling direction of the snowmobile, and wherein said muffler is generally aligned with a longitudinal centerline of the snowmobile.

9. A snowmobile as set forth in claim 8, further comprising
a steering shaft operably connected to the skis for steering said snowmobile, and
the steering handlebar fixed to an upper end of the steering shaft for actuation of the steering shaft, wherein the steering shaft passes between the muffler and the engine.

10. A snowmobile comprising:
a vehicle body,
a vehicle body frame supporting the vehicle body thereon,
a steering handlebar,
a left-right pair of skis, said skis being steered by an operation of the steering handlebar,
an engine,
a track belt provided on the vehicle body, said track belt being driven by said engine,
front suspension members for supporting said skis,
rear shock absorbers for supporting said track belt, wherein
portions between upper ends of front suspension members and a front portion of the rear shock absorbers are reinforced by side frame sections, the side frame sections being protuberant to the upper side and curved downwards, and wherein said side frame sections are detachably attached to the vehicle body frame
wherein each of the side frame sections comprises a hollow pipe having a plurality of internal reinforcement ribs formed on an inner surface thereof; and
wherein said hollow pipe has a closed cross section.

11. In a snowmobile comprising:
a vehicle body,
a steering handlebar,
a left-right pair of skis, said skis being steered by an operation of the steering handlebar,
an engine,
a track belt provided on the vehicle body, said track belt being driven by said engine,
front suspension members for supporting said skis
rear shock absorbers for supporting said track belt, the improvement comprising a left side frame member and a right side frame member, wherein
both the left side and right side frame sections extend between a location adjacent an upper end of one of the front suspension members and a location adjacent an upper end of one of the rear shock absorbers, and
both the left side and right side frame sections extend generally in a longitudinal direction of the snowmobile and are non-linear in shape so as to curve downward at a rear portion thereof, wherein each of the side frame sections comprises a hollow pipe having a plurality of internal reinforcement ribs formed on an inner surface thereof and
wherein said hollow pipe has a closed cross section.

12. In the snowmobile as set forth in claim 11, wherein the snowmobile comprises a steering shaft for transmitting a steering force produced by the steering handlebar to the skis,
the steering shaft is rotatably supported by a cross pipe which forms a connection between said left side frame member and said right side frame member.

13. In the snowmobile as set forth in claim 11, wherein said hollow pipe of each member of said right and left side frame sections is formed of an angular pipe of closed cross section, the angular pipe comprising said plurality of reinforcement ribs.

14. In the snowmobile as set forth in claim 11, wherein an air cleaner is supported on said right and left side frame sections.

15. In the snowmobile as set forth in claim 11, wherein said hollow pipe of each member of said right and left side frame sections is formed of an angular pipe of closed cross section, the angular pipe comprising said plurality of reinforcement ribs formed on an interior surface thereof.

16. In the snowmobile as set forth in claim 11, wherein said hollow pipe of each member of said right and left side frame sections is formed of an angular pipe having a closed rectangular cross section, the angular pipe comprising at least two reinforcement ribs.

17. A snowmobile as set forth in claim 11, wherein the snowmobile further comprises a muffler, wherein said muffler is mounted on the forward side of the engine relative to the forward traveling direction of the snowmobile, and wherein said muffler is generally aligned with a longitudinal centerline of the snowmobile.

18. A snowmobile as set forth in claim 17, further comprising
a steering shaft operably connected to the skis for steering said snowmobile, and
the steering handlebar fixed to an upper end of the steering shaft for actuation of the steering shaft,
wherein the steering shaft passes between the muffler and the engine.

19. In a snowmobile comprising:
a vehicle body,
a vehicle body frame supporting the vehicle body thereon,
a steering handlebar,
a left-right pair of skis, said skis being steered by an operation of the steering handlebar,
an engine,
a track belt provided on the vehicle body, said track belt being driven by said engine,
front suspension members for supporting said skis
rear shock absorbers for supporting said track belt, the improvement comprising a left side frame member and a right side frame member, wherein
both the left side and right side frame sections extend between a location adjacent an upper end of one of the front suspension members and a location adjacent an upper end of one of the rear shock absorbers, and
both the left side and right side frame sections extend generally in a longitudinal direction of the snowmobile and are non-linear in shape so as to curve downward at a rear portion thereof, wherein said right and left side frame sections are detachably attached to the vehicle body frame;
wherein each of the side frame sections comprises a hollow pipe having a plurality of internal reinforcement ribs formed on an inner surface thereof; and
wherein said hollow pipe has a closed cross section.

* * * * *